March 25, 1941.  J. H. ROETHEL  2,236,449
VENTILATING WINDOW GUIDE
Filed Nov. 22, 1937  3 Sheets-Sheet 1
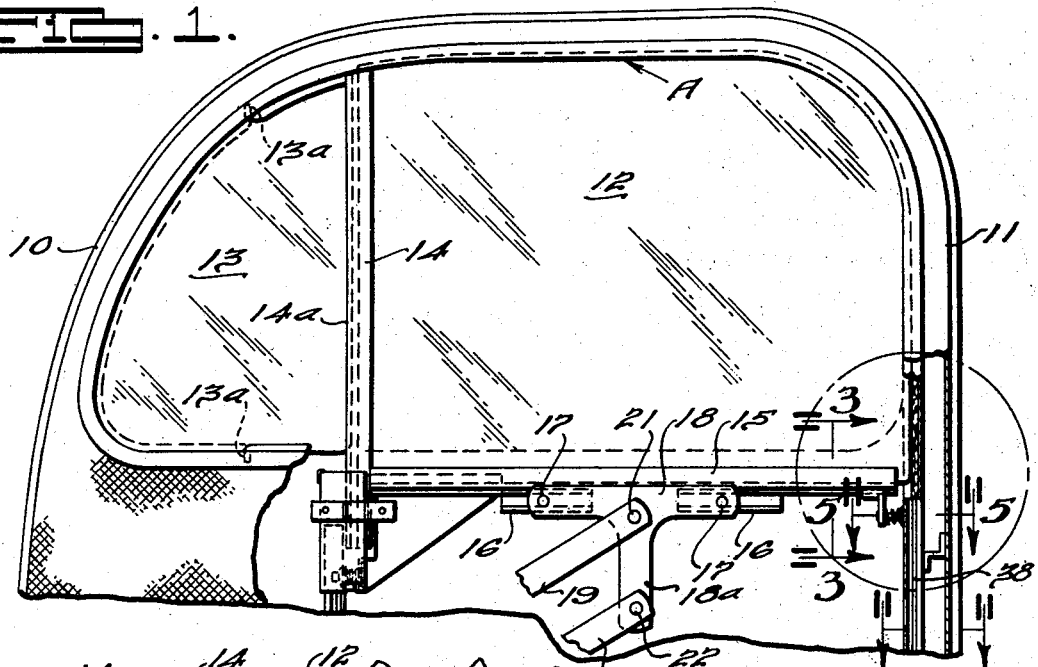
INVENTOR
John H. Roethel.
BY
Dike, Calvert & Gray
ATTORNEYS.

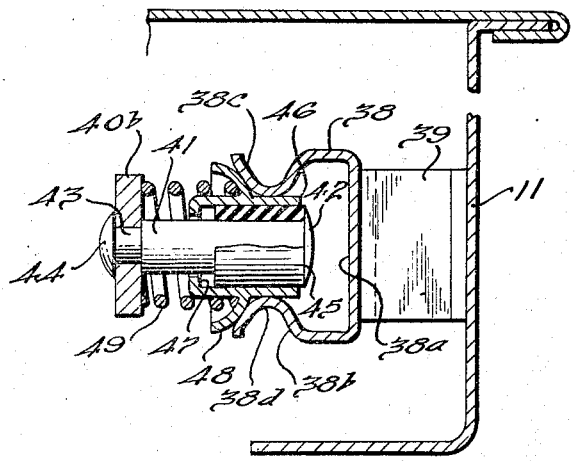

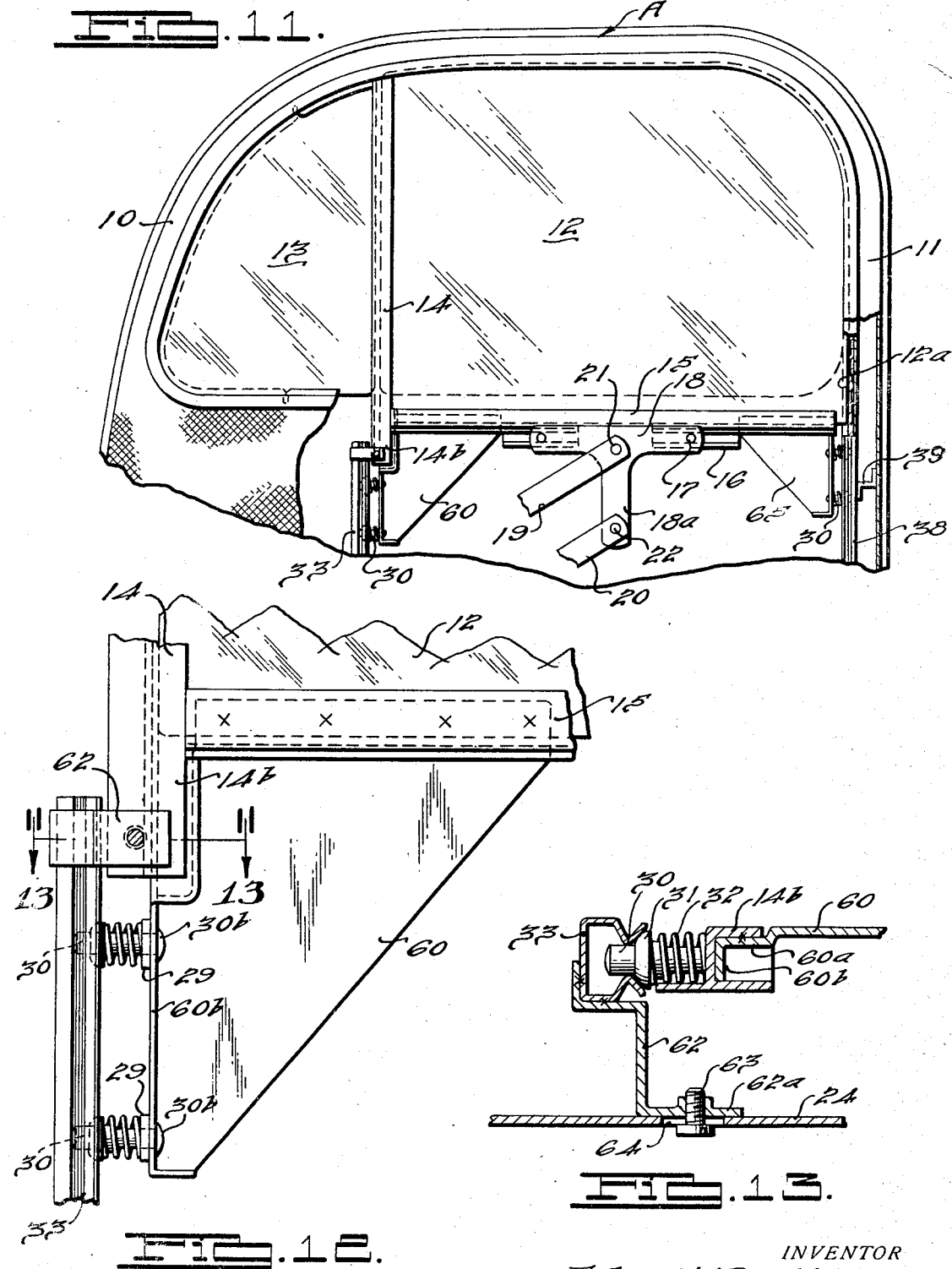

Patented Mar. 25, 1941

2,236,449

UNITED STATES PATENT OFFICE 2,236,449

VENTILATING WINDOW GUIDE

John H. Roethel, Detroit, Mich., assignor to Marvel Equipment Corporation, Detroit, Mich., a corporation of Michigan Application November 22, 1937, Serial No. 175,780

29 Claims. (Cl. 296—44.5)

This invention relates to devices for guiding and controlling glass or transparent panels of windows, particularly windows of automobiles in which the transparent panels or panes are adapted to be raised and lowered, usually through the medium of some suitable window regulator mechanism operable from the inside of the automobile body. The invention is particularly useful in connection with windows of vehicle bodies, such as automobile bodies, wherein the window opening is controlled by means of a pivoted transparent panel and a vertically slidable transparent panel cooperable in fully raised positions to close the window opening.

An object of the invention is to provide improved means for guiding and controlling the sliding panel during its upward and downward movements so that the panel will travel more easily and with less frictional resistance while at the same time it will be held firmly in substantially all positions thereby minimizing vibrational movements thereof during the travel of the vehicle.

A further object is to provide an improved ventilating window structure of the type having a pivoted panel and a sliding panel cooperable, when raised, to close the window opening and in which the sliding panel at its normally unsupported end adjacent the pivoted panel is guided into and out of the window well by fixed guides within the well effective to support and hold the panel at points increasingly spaced in a vertical direction as the panel moves downwardly into the well.

A further object is to provide a compound guide for the sliding panel, particularly a sliding panel of a ventilating window of the foregoing type, the guide being adapted to be fixed within the window well and comprising a relatively short upper channel section of materially less length than the height of the panel and through which the metal bound edge of the panel passes during its vertical travel and also comprising a relatively long guide, preferably of a length at least as great as the height of travel of the panel, slidingly receiving a projecting member, stud or the like secured to the lower edge of the panel adjacent said short upper channel section, the construction and operation being such that one end, such as the forward end, of the sliding panel is guidingly supported by said compound guide at separate points increasingly spaced in a vertical direction as the panel is lowered into the window well. Hence, by virtue of the improved construction of the compound guide and associated parts the normally unsupported edge of the panel is held against tilting and vibrational movements in a better and more effectual manner, while at the same time the amount of frictional resistance to the operation of the panel is materially decreased thereby enabling the window to be raised and lowered with a minimum of effort.

In accordance with conventional automobile body construction the door or other side wall portion of the body is provided with a window opening adapted to be closed or partially so by means of a glass panel which may be lowered into a well below the window opening. In conventional practice the front and rear upright edges of the glass panel are guided within the well by means of channels lined with felt or equivalent material which receive and embrace the edges of the glass. To provide proper guiding of the glass within the window well and also to prevent rattling of the glass when partly or fully lowered it is necessary in practice to provide a relatively snug fit of the edge of the glass in the felt or otherwise lined channel. Owing to allowable tolerances in production and manufacturing variations or inaccuracies it has ben difficult to secure uniformly the desired fit of the edges of the glass within the guide channels. If the glass fits too tightly excessive friction is set up rendering it more difficult to raise and lower the glass and placing undue strain on the regulator mechanism, and since this condition occurs frequently in production it has been necessary to make the window regulators stronger than need be, thereby increasing their cost. Since these felt lined channels, mounted in the window well, are exposed to the weather and become wet as a result of water running down the edges of the window opening into the channels during rainy weather or when the car is washed, even greater effort is required under such conditions to operate the window.

It will thus be seen that an accurate sliding fit of the glass within the guide channels is extremely difficult to obtain owing to variations due not only to manufacturing conditions but also to the wet or dry condition of the channel linings. Moreover, such lined guide channels are relatively expensive not only from a manufacturing standpoint but also from the standpoint of increased labor expense due to difficulties in installing the glass therein on the assembly line.

An object of the present invention is to provide improved means for guiding the window glass into and out of the window well, permitting easy and economical installation of the glass, which means is relatively simple in construction, capable of effecting substantial savings in material and labor costs, more efficient in use, and permitting the use of window regulators of less expensive construction.

A further object is to provide an improved window glass guide which eliminates the necessity of directly guiding the upright edge of the glass into and out of the window well, which provides more accurate control of the glass regardless of manufacturing variations, and which automatically accommodates or compensates for such variations without appreciably increasing the effort required to move the glass up and down.

Another object is to provide guiding means at, but independent of, the opposite upright edges of the glass which permits and also takes up slight end play, i. e. edgewise movements of the glass in its plane, frequently caused by the throw of the window regulator or resulting from small inaccuracies in the window regulator construction.

Another object of the invention is to provide an improved channel member for retaining the lower edge of the glass, in which such channel member may embody detachably connected sections and may have one or a plurality of devices at either or each end thereof adapted to travel up and down within a fixed guide or guides in the window well, and embodying yielding means to hold the glass against rattling and also to take up or permit slight movements of the glass. More particularly such device preferably comprises a stud slidable vertically in the guide and a spring pressed compression member slidable on the stud against the guide, an advantageous feature being that the window glass can, by virtue of the invention, be guided substantially or nearly in line with the upright edge of the glass independently of this edge and without interference therewith.

A further object of the invention is to provide improved guide means for the sliding transparent panel, particularly a sliding panel of a ventilating window of the foregoing type, wherein there is provided in the window well adjacent opposite upright edges of said sliding panel a pair of upright channel guides fixed within the window well and which are engaged by projecting guide devices carried by the glass retainer channel at the lower edge of the window glass, said channel guides being arranged to guide the sliding panel or window glass within the window well wholly independently of the upright edges of the panel or glass, and the front guide which is adjacent the line of juncture between the pivoted and sliding glass panels being located forwardly of the edge of the sliding panel and engaged by vertically spaced guide devices carried by the glass retainer channel.

Other objects of this invention will appear in the following description and appended claims, reference being had to the accompanying drawings forming a part of this specification wherein like reference characters designate corresponding parts in the several views.

Fig. 1 is an inner fragmentary side elevation, partly broken away and partly in section, of an automobile door embodying the invention.

Fig. 2 is an enlarged fragmentary view of the compound guide structure shown in Fig. 1.

Fig. 3 is an enlarged section taken substantially through lines 3—3 of Fig. 1 looking in the direction of the arrows.

Fig. 4 is a section taken substantially through lines 4—4 of Fig. 2 looking in the direction of the arrows.

Fig. 5 is a section taken substantially through lines 5—5 of Fig. 1 looking in the direction of the arrows.

Fig. 6 is a section taken substantially through lines 6—6 of Fig. 1 looking in the direction of the arrows.

Fig. 7 is an enlarged fragmentary view illustrating the portion of the structure enclosed within the circle in Fig. 1.

Fig. 8 is a perspective view of the insert guide channel forming part of the compound guide.

Fig. 9 is a view similar to Fig. 5 but illustrating a modification.

Fig. 10 is a view similar to Fig. 6 but illustrating the modified guide channel of Fig. 9.

Fig. 11 is a view similar to Fig. 1 but illustrating a modified form of guide mechanism for the sliding window panel.

Fig. 12 is an enlarged fragmentary view of the front guide structure shown in Fig. 11.

Fig. 13 is a section taken through lines 13—13 of Fig. 12 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated certain embodiments of the invention applied, by way of example, to an automobile door. It will be understood, however, that the embodiments herein exemplified may in part or in whole be utilized in other relations and in other structures. In Fig. 1 there is illustrated an automobile door A which may be a front door including a front sloping pillar 10 and a rear vertical pillar 11, the upper portion of the door being provided with a main window opening adapted to be closed by means of a vertically slidable glass or other transparent panel 12 and a swinging glass or other transparent panel 13. In the present instance the panel 13, which is of the so-called wing type, is disposed at the forward part of the window opening and the sliding panel 12 is disposed in rear thereof, and these panels are preferably arranged so that when in fully closed positions they extend in the same or in substantially parallel planes and cooperate together to close the main window opening. The wing type panel 13 may be pivoted at points 13a so as to swing horizontally about an up and down axis. The sliding panel 12 has secured to the upright edge thereof adjacent the panel 13 a metal binding strip or bar 14 in the form of a channel embracing the said edge of the panel 12 and fixed thereto. As shown in Fig. 4, the metal binding strip or bar 14 has a projecting flange 14a which forms an overlap for the adjacent upright edge of the wing 13 when swung into closed position.

It will be understood that the term "glass" is used herein in a generic sense and is intended to comprehend any panel regardless of material movable up and down to close or open a window opening.

Secured to the lower edge of the window glass panel 12 is what is herein termed a glass retainer member or bar or glass retainer channel 15 which preferably comprises a rolled channel member, see Fig. 3, having a liner of felt or other material embracing the lower edge of the glass and secured thereto. To the back side of the channel member 15 is spot welded a pair of longitudinally spaced rolled metal rail sections 16 which are spaced apart between their inner ends as shown in Fig. 1 so as to permit assembly of the window regulator. These sections 16, if desired, may be made in one length with a notch or aperture through the bottom thereof corresponding to the space between their inner ends, shown in Fig. 1, to permit passage of one of the regulator studs 17 when the window glass is lowered into the window frame and assembled with the regulator in the extreme lowered position of the latter. The rail sections 16 are conventionally formed to provide longitudinal guideways for the headed studs, rollers or the like 17 carried at the outer end of the window regulator, the studs travelling or sliding longitudinally back and forth in the guideways of sections 16 when the window is raised and lowered.

Any suitable window regulator may be utilized and in the present instance a regulator of the parallel arm type is in part shown for the purpose of providing through the medium of the spaced projecting studs 17 a support for the window panel 12 at two horizontally spaced points. A single arm regulator or other type of two-arm regulator may be used if desired. The illustrated regulator comprises a horizontal bar 18 to which the studs 17 are secured as by riveting, this bar having a depending angular extension 18a. The parallel arm regulator, well known in the art, comprises a pair of parallel swinging arms 19 and 20 pivoted at their outer ends at vertically spaced points 21 and 22 to the bar 18 and its extension 18a. A further detailed description of the parallel arm regulator is not deemed necessary herein as it may be of conventional construction comprising the usual mounting plate secured to the inner metal door panel 24 to which mounting plate the inner ends of the arms 19 and 20 are pivoted at vertically spaced points corresponding to the spacing of the points 21 and 22. The arms 19 and 20, as is well known, are swung through the medium of suitable gearing on the mounting plate operated from a crank handle mounted at the inner side of the door or body.

The forward upright edge of the sliding panel 12, i. e. the edge to which is secured the metal channel strip or bar 14, is guided during its up and down travel by means of what is herein termed for convenience a compound guide, see Figs. 2 and 4. This guide, in the present embodiment, includes an upright or substantially vertical supporting channel 23. This main supporting channel 23 is adjustably secured at the inner metal door or body panel 24 of the body through the medium of a channel shaped bracket 25. The outer central web 25a of this bracket is spot welded to the vertical side 23a of the main channel and has out-turned flanges 25b provided with suitable screw bosses for the reception of adjusting screws 26 passing through slots 27 in the inner door panel 24. By means of adjusting screws 26 and slots 27 the bracket 25 and hence the main channel 23 may be adjusted in a longitudinal direction. It will be noted that the main supporting channel 23 receives the bar 14 carried by the forward edge of the sliding panel 12. This bar 14 has a depending extension 14b below the glass retainer channel 15, this extension terminating preferably somewhat above the lower terminal end of the channel 23 when the panel 12 is in its fully raised position as shown in Figs. 1 and 2.

Secured as by spot welding to the back face of the glass retainer channel 15, and forwardly of the rail members 16, is an angle bracket or angular gusset type plate 28. The forward upright edge of this bracket or plate is offset or embossed at 28a to extend into the back side of the channel bar 14 below the window panel 12, the forward edge of the plate 28 being flanged at 28b to fit within the channel 14, as shown in Fig. 4, the parts 28a and 28b being spot welded to the bar 14. The flange 28b extends somewhat below the lower end of the window bar extension 14b, see Fig. 2, terminating in a return bent flange 28c secured to the adjacent portion of the plate 28 for reinforcement. Spot welded to the forward face of the flange 28b and below the lower end of the extensions 14b of the bar 14 is a spacer block or plate 29 and to the parts 29 and 28b is riveted the reduced end of the shank 30a of a stud 30, see Fig. 4. Slidingly mounted upon the stud 30 is a substantially conical washer or compression member 31 preferably of cup-like construction engaged by a compression spring 32 surrounding the shank 30a. The washer 31 has a central cylindrical sleeve, as hereinafter described, terminating in a flange movable toward and from a rear shoulder of the stud 30 thereby anchoring the washer at its forward limit of travel and permitting rearward sliding movement thereof against the action of spring 32.

The compound guide includes an upright or substantially vertical guide member 33 which, in the present instance, comprises a rolled metal channel section, as shown in Fig. 4, extending from the supporting channel 23 to a point well down into the window well below the main window opening, this channel guide 33 having sufficient length to guide the panel 12 within the well throughout its vertical range of movement. The channel guide 33 at its upper end is, in the present instance, telescoped into the lower end of the supporting channel 23 and the forward central web of the channel guide 33 abuts against the inner face of the forward central vertical web 23c of the channel 23, and the channel 33 is spot welded to the channel 23 substantially in the position shown in Fig. 2. It will be noted that the channel guide 33 is offset forwardly out of vertical alinement with the bar 14 on the forward edge of the sliding panel 12. The channel guide 33 preferably faces rearwardly in the same direction as the main channel 23 and is formed, as shown in Fig. 4, with reversely tapered portions providing a constricted neck 33a slidingly receiving the stud 30 and flaring track portions slidingly engaged by the crowned or convex face of the washer or compression member 31. It will be seen that the stud may slide in and out within the guideway 33a of the channel 33 thereby permitting compensation for variations in the travel of the glass.

The compound guide also includes, in addition to the relatively long channel guide 33, a relatively short channel guide 34 which is also mounted upon the supporting channel 23. The relatively short channel or guide 34 is shown in Fig. 8 and preferably comprises a detachable insert member which may be readily installed within the channel 23 after the installation of the window panel 12 and the guide stud 30 with its associated parts within the channel 33. The insert channel guide 34 may comprise a channel having at its upper end a depth substantially corresponding to the supporting channel 23. The forward central web 34a of this channel terminates at 34b and is cut away along the lines 34c and 34d to provide a notched-out portion shaped to fit around or straddle the upper telescoped end of the channel guide 33. The side flanges of the channel section 34 at the rear inner edges thereof are provided with liners of felt or other material 35. These liners may comprise strips which are folded around the edges of the channel 34 as at 35a and cemented or otherwise secured thereto. The insert channel member 34 is attached within the main channel 23 and held in place by means of a pair of bent-up hook-like tabs 37 which hook into notches in the lower edges of the side flanges 23a and 23b of the channel 23. The member 34 is also secured in place by means of an upper tongue or tab 36 adapted to be bent down over the upper edge of the web 23c of the supporting channel 23, as shown in Fig. 2. From the foregoing it will be seen that the supporting channel 23 with the insert channel 34 provides a relatively short substantially vertical guide for the bar 14 along the forward edge of the panel 12. This bar travels through the insert channel 34 and engages the liners 35. Thus, when the sliding panel 12 is in its fully raised position the depending extension 14b of the bar 14 at the forward edge of this panel lies within the channel section 34 in snug engagement with the liners 35 thereof. At the same time the guide stud 30 and compression member 31 engage the channel guide 33 which is offset forwardly of the bar 14 and its extension. At this time it will be seen that the guide stud 30 extends beneath and across the lower end of the bar extension 14b into sliding engagement with the relatively long channel guide 33. As the window panel is lowered the amount of guiding engagement of the bar 14 with the compound guide is limited to the height of the insert channel section 34 and hence as this glass is lowered it will be guidingly supported at separate points in substantially the same vertical plane which points are increasingly spaced in a vertical direction as the panel is lowered in the window well. Thus, when the panel 12 is dropped into the well to its fully lowered position the forward edge thereof will be guided at its upper end through engagement with the short channel section 34 and its lower end will be guided through engagement of the stud and washer 30, 31 with the channel guide 33 at or near the bottom of the window well. Hence, the effective guiding support of the forward edge of the sliding panel 12 improves as the panel 12 is lowered from its top position since the guides 34 and 30 move further apart as the window is lowered, but at the same time the frictional resistance to the movement of the window panel remains at all times substantially the same.

Referring particularly to Figs. 3 and 5 to 7 inclusive, the rear upright edge 12a of the glass panel 12 may be guided within the window opening through the medium of a felt or otherwise lined channel 50 which is designed to embrace the edge of the glass when the glass is fully raised. This channel 50 preferably terminates at or slightly below the lower edge of the window opening as indicated at 50a. Within the well below the window opening the window panel 12 is guided in its up and down path of movement substantially entirely through guiding means which is operative independently of the edge 12a.

For this purpose there is mounted within the window well an upright or vertically extending fixed guide member 38, which may be substantially or approximately beneath the upright edge of the glass panel. In Figs. 6 and 7 the guide is illustrated as arranged substantially in vertical alinement with the upright edge 12a of the glass. The channel guide 38 may be spaced inwardly from the base 11a of the pillar 11 and supported therefrom through the medium of angle brackets 39 spot welded to the pillar and to the channel guide 38. The guide 38 extends well down into the window well a sufficient distance to accommodate the full range of vertical travel of the panel 12.

The glass retainer member or bar 15 is provided at its rear end with a projecting guide member or device adapted to cooperate with the vertical guide 38. Spot welded to the base of the retainer channel 15, as seen in Figs. 3 and 7, is the horizontal flange 40a of an angle bracket 40. To the vertical flange 40b of this bracket is riveted at 44 the reduced end 43 of a cylindrical stud 41. The end of this stud has a head 42 forming an annular shoulder against which a cushion sleeve 45 bears. The sleeve 45 may be of resilient rubber or other relatively compressible non-metallic material and embraces the stud 41, see Fig. 5. Surrounding the sleeve 45 and slidable thereon is the cylindrical sleeve of a compression member 46. This member terminates in an annular inturned flange 47 slidable freely over the stud 41 and limited in its outward movement by engagement with the end of the sleeve 45. The compression member 46 may be a die casting and is provided with a convex or flared annular washer portion 48 providing an annular cup-shaped recess at its back face for receiving and retaining one end of a compression spring 49, the opposite end of the spring bearing against the flange 40b of the bracket 40. Thus, the compression member 46 may slide longitudinally on the stud 41 upon the cushioning sleeve 45 and against the effort of the spring 49 which at all times is under compression.

The guide member 38 is in the form of a channel having a base 38a and parallel side walls terminating in inwardly converging portions 38b. This guide member is preferably in the form of a rolled section and the converging portions 38b terminate in a constricted neck portion 38d, the metal thence being bent outwardly to provide diverging flared track portions 38c. When the window is installed the guide device 41, 46 preferably has a sliding fit in two directions against the constricted neck portion 38d, i. e. vertically and longitudinally. The crowned face of the washer portion 48 contacts the flaring or diverging portions 38c and at this time the spring 49 is under compression, thereby spacing the flange 47 from the shoulder formed by the inner end of the sleeve 45. This clearance space is normally sufficient so as to permit slight longitudinal sliding of the compression member 46 on the sleeve 45 during operation of the window to compensate for slight variations in the construction of the associated operating and guiding members for the window. As shown in Fig. 6, when the window panel 12 is lowered into the well the edge 12a thereof is permitted to pass through the channel guide 38 between the opposed portions 38d thereof. It will be understood, however, that the channel guide 38 may be positioned at a greater distance from the edge of the window glass to permit the latter to pass by the guide without passing therethrough.

In Figs. 9 and 10 there is illustrated a modified construction wherein the guide channel 38 is replaced by means of a channel guide 51 which may be secured and located in the same manner through the medium of the upper and lower angle brackets 39. Each channel guide 51 has a bottom wall 51b and parallel side walls 51a which terminate in outer flared track portions 51c. There may be mounted upon the bracket flange 40b a guide stud 52 having a cylindrical head 53, the stud being riveted at 54 to the bracket flange. Mounted upon the head 53 of the stud is a compression or cup-shaped washer 55 which may also be in the form of a die casting. This compression member 55 has a convex or crowned face engageable with the track portions 51c and is centrally recessed to provide a cylindrical guide portion 56 slidable upon the head 53 and terminating in an annular stop flange 57 movable toward and from the shoulder formed by the head 53. A compression spring 58, similar to spring 49, is interposed between the washer 55 and the bracket flange 40b. In this instance the channelway in member 51 is somewhat wider than the channelway in the channel guide 38 and is so spaced from the head 53 of the guide stud that the entire engagement of the guide device is accomplished through the washer 55 and flared contact surfaces 51c.

Referring to the embodiment illustrated in Figs. 11 to 13 inclusive, the glass retainer channel 15 is provided at its forward end adjacent the joint between the glass panels 12 and 13 with a bracket 60 similar to the bracket 28 of the previous embodiment. The bracket 60 comprises a metal plate which may be spot welded to one side of the glass retainer channel 15. This plate has a vertical embossment 60a similar to the embossment 28a and has an inturned vertical flange 60b by which the plate 60 fits into the depending extension or leg 14b of the channel bar 14, the parts being spot welded or otherwise secured together. Mounted upon the vertical flange 60b below the leg 14b are a pair of vertically spaced guide devices each comprising a guide stud 30, compression member or washer 31 and compression spring 32, corresponding to the guide device illustrated in Figs. 1 to 4 inclusive. If desired, to facilitate assembly of the window panel, the lower guide device may be made detachable from the bracket flange 60b. In such instance, instead of the stud being riveted to the flange in the manner illustrated at 30b, the lower stud 30 will extend through a hole in the flange 60b and its projecting end provided with screw threads for engagement by a lock nut. By removing the lock nut the lower stud 30 together with the washer and spring may be detached from the flange 60b.

The vertically spaced guide devices 30—32 carried by the bracket 60 cooperate with a vertical channel guide 33, similar to the channel guide 33 of the previous embodiment. In this instance, however, the channel guide is shown supported by means of a bracket 62 substantially in the plane of the glass 12 but forwardly of the front vertical edge thereof and hence out of the path of travel thereof. This bracket is angularly flanged and spot welded or otherwise secured to the channel 33 and also has an inner flange 62a adjustably secured by means of a screw 63 adjustable within a slot 64 in the inner door panel 24. The rear edge 12a of the glass panel 12 may also be guided within the window well through the medium of one or a plurality of vertically spaced guide devices 30—32 carried by a bracket 65 secured to the glass retainer channel 15. Two of such devices are herein shown and they cooperate with the channel guide 38 in the manner similar to the embodiment of Figs. 5 to 7 inclusive. In the same manner as above described the lower guide device 30, 32 carried by the bracket 65 may be made detachable, if desired, through the medium of a lock nut engageable with a threaded end of the guide stud. It will be understood that the guide device 30—32 and guide 33 may be constructed similarly to the guide device 41—49 and guide 38, respectively, as shown in Fig. 5.

In conventional practice the door or body is provided with an inner pressed metal panel, such as the inner door panel 24, and an outer pressed metal panel, such as panel 66 (see Fig. 3), the inner panel supporting a garnish molding 67 which extends around the window reveal. Between the upper downwardly flanged edges of the garnish molding 67 and the panel 66 is a longitudinal slot along the lower edge of the window opening through which the glass slides, and below the window opening between the outer and inner panels is the window well 67 within which the channel guides 33, 38 and 51 are located.

I claim:

1. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; a pair of upright guide members adapted to be mounted in said well, each lying out of the path of travel of one upright edge of the main panel beyond said edge, a bracket adapted to be secured to the lower edge of the main panel and having a guide device extending longitudinally of the panel below said depending extension for engagement and travel along with one of said guide members, a bracket adapted to be secured to the lower edge of the main panel at the opposite end thereof and having a guide device extending longitudinally of the panel and cooperable with the other guide member for travel along the same.

2. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; an upright guide member adapted to be mounted in said well and arranged forwardly of said depending extension, a guide device adapted to be carried by the lower edge of the main panel and extending across and below said extension for cooperation with and travel along said guide member, a fixed channel member within said well carrying said guide member, and a detachable insert member carried by said channel member and cooperable with said bar in all positions thereof for guidingly supporting the same.

3. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; guide means for said main transparent panel comprising a channel support adapted to be mounted in said well, an upright guide member having its upper end secured to said channel support and adapted to be engaged by a guide device carried by the lower edge of said main panel, and an insert guide piece carried by said channel support and slidingly engageable by said bar in all positions thereof for guiding said main panel.

4. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; a channel piece adapted to be mounted within said well, an upright guide having its upper end telescoped in said channel piece and secured thereto, and an insert guide member for said bar adapted to be mounted within said channel piece.

5. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; a channel piece adapted to be mounted within said well, an upright guide having its upper end telescoped in said channel piece and secured thereto, and an insert guide member for said bar adapted to be mounted within said channel piece, said insert member being notched to receive the upper end of said guide member.

6. A guide device adapted for mounting on a sliding window panel having a support for the device, comprising a cylindrical stud, a sleeve of non-metallic material mounted on said stud, a cylindrical metal sleeve surrounding said first named sleeve and slidable thereon, means for limiting movement of said metal sleeve in one direction, and a spring urging said metal sleeve toward its limit of movement in said direction, said sleeve having means adapted to slidingly engage a guide member for guiding said window panel.

7. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; an upright guide member adapted to be mounted in said well and arranged out of the path of travel of the adjacent upright edge of the main panel, a bracket adapted to be secured to the lower edge of the main panel and having a guide device extending in a direction longitudinally of the panel below said depending extension for engagement with and travel along said guide member, said guide device comprising a spring pressed element yieldable bodily in a longitudinal direction.

8. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; an upright guide channel adapted to be mounted in said well and arranged out of the path of travel of the adjacent upright edge of the main panel, a member adapted to be secured to the lower edge of the main panel, a guide device carried by said member at one end thereof extending in a direction longitudinally of the panel below said depending extension and engageable with spaced substantially parallel edges of said channel for travel therealong in a path spaced from the base of the channel.

9. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; an upright guide channel adapted to be mounted in said well and arranged out of the path of travel of the adjacent upright edge of the main panel, a member adapted to be secured to the lower edge of the main panel, a guide device carried by said member at one end thereof extending in a direction longitudinally of the panel below said depending extension and engageable with spaced substantially parallel edges of said channel for travel therealong in a path spaced from the base of the channel, said guide device comprising a compression element bodily yieldable in a longitudinal direction.

10. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; an upright guide member adapted to be mounted in said well and arranged out of the path of travel of the adjacent upright edge of the main panel, a bracket adapted to be secured to the lower edge of the main panel and having a guide device extending in a direction longitudinally of the panel below said depending extension for engagement with and travel along said guide member, and a second guide arranged above said guided device in all positions thereof and adapted to be engaged by said bar during the up and down movement of the main panel.

11. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; an upright guide channel adapted to be mounted in said well and arranged out of the path of travel of the adjacent upright edge of the main panel, a member adapted to be secured to the lower edge of the main panel, a guide device carried by said member at one end thereof extending in a direction longitudinally of the panel below said depending extension and engageable with spaced substantially parallel edges of said channel for travel therealong in a path spaced from the base of the channel, and a second guide arranged above said guide device in all positions thereof and adapted to be engaged by said bar during the up and down movement of the main panel.

12. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; a pair of upright guide members adapted to be mounted in said well in positions normally free of engagement by the upright edges of the main panel, a guide device adapted to be secured to the lower edge of the main panel at one end thereof extending in a direction longitudinally of the panel below said depending extension for engagement with and travel along one of said guide members, and a guide device adapted to be secured to the lower edge of the main panel at the opposite end thereof for engagement with and travel along the other guide member, at least one of said guide devices comprising a spring pressed element yieldable bodily in a longitudinal direction.

13. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; a pair of upright guide members adapted to be mounted in said well in positions normally free of engagement by the upright edges of the main panel, a guide device adapted to be secured to the lower edge of the main panel at one end thereof extending in a direction longitudinally of the panel below said depending extension for engagement with and travel along one of said guide members, and a guide device adapted to be secured to the lower edge of the main panel at the opposite end thereof for engagement with and travel along the other guide member, at least one of said guide devices being spring pressed and yieldable bodily in a longitudinal direction.

14. In a window structure of the type having a window opening, a window well therebelow, a pivoted wing type panel and a vertically slidable main transparent panel cooperable to close said opening, said main panel having a bar secured to its upright edge adjacent the pivoted panel and provided with a depending extension within the well; a pair of upright guide members adapted to be mounted in said well in positions normally free of engagement by the upright edges of the main panel, a guide device adapted to be secured to the lower edge of the main panel at one end thereof extending in a direction longitudinally of the panel below said depending extension for engagement with and travel along one of said guide members, and a guide device adapted to be secured to the lower edge of the main panel at the opposite end thereof for engagement with and travel along the other guide member, at least one guide member comprising a channel having spaced substantially parallel edges upon which the adjacent guide device is adapted to travel in a path spaced from the base of the channel.

15. A guide adapted to be mounted within a window well for guiding an up and down sliding window panel, comprising a pair of metal channels of unequal lengths adapted to be arranged one to extend above the other substantially in line, the side flanges of one channel being of greater depth than the side flanges of the other to receive and guide one upright edge of the panel, and the side flanges of the channel of lesser depth terminating in spaced parallel edges upon which a guide device on the window panel is adapted to travel.

16. A guide adapted to be mounted within a window well for guiding an up and down sliding window panel, comprising a pair of metal channels of unequal lengths adapted to be arranged one to extend above the other substantially in line, the side flanges of one channel being of greater depth than the side flanges of the other to receive and guide one upright edge of the panel, and the side flanges of the channel of lesser depth terminating in spaced parallel edges upon which a guide device on the window panel is adapted to travel, and a spring pressed guide device adapted to be secured to the lower edge of the panel at one end thereof and arranged to travel upon said edges.

17. A guide adapted to be mounted within a window well for guiding an up and down sliding window panel, comprising a pair of channels one telescoped into the end of the other and having spaced side flanges terminating in parallel edges upon which a guide device on the window panel is adapted to travel, and a detachable insert channel piece mountable within the said other channel and arranged to receive and guide the adjacent upright edge of the panel.

18. In a window structure of the type having a window opening, a window well therebelow, a pivoted wing-type panel and a vertically slidable transparent panel cooperable to close said opening; guide means adapted to be mounted in said well for guiding the upright edge of the sliding panel, which is adjacent the pivoted panel, into and out of the well, comprising a relatively short fixed channel guide at the upper part of the well through which said edge of the panel slides and an adjacent relatively long upright guide movably receiving a projection on the bottom of the panel, said guide means being operable to guidingly support said sliding panel at separate points in substantially the same vertical plane increasingly spaced in a vertical direction as the panel is lowered into the well, said guides facing in substantially the same direction.

19. In a window structure of the type having a window opening, a window well therebelow, a pivoted wing-type panel and a vertically slidable transparent panel cooperable to close said opening; guide means adapted to be mounted in said well for guiding the forward upright edge of the sliding panel into and out of the well, comprising a fixed guide at the upper end of the well with which the said edge of the sliding panel slidingly cooperates and a second fixed guide movably engaged by a projection on the lower edge of the sliding panel, said first named guide terminating adjacent the lower edge of the window opening and located substantially in line with the line of juncture of said panels and said second named guide also terminating below the window opening and beyond the forward edge of the sliding panel, said guides extending substantially end to end but out of vertical alignment.

20. In a window structure of the type having a window opening, a window well therebelow, a pivoted wing-type panel and a vertically slidable transparent panel cooperable to close said opening; guide means adapted to be mounted in said well for guiding the forward upright edge of the sliding panel into and out of the well, comprising a fixed guide at the upper end of the well with which the said edge of the sliding panel slidingly cooperates and a second fixed guide movably engaged by a projection on the lower edge of the sliding panel, said first named guide terminating adjacent the lower edge of the window opening and located substantially in line with the line of juncture of said panels and said second named guide also terminating below the window opening and beyond the forward edge of the sliding panel, said guides being positioned out of vertical alignment and the upper end of the second named guide being connected to the lower end of the first named guide.

21. In a window structure of the type having a window opening, a window well therebelow, a pivoted wing-type panel at the forward part of the window opening and a substantially vertically slidable transparent panel in rear thereof; guide means adapted to be mounted entirely within the well for guiding the forward edge of the sliding panel comprising short and long guides with which the forward edge and a device on the forward bottom edge of the sliding panel, respectively, cooperate, the long guide being disposed forwardly of the short guide and beyond the forward edge of the sliding panel.

22. In a window structure of the type having a window opening, a window well therebelow, a pivoted wing-type panel at the forward part of the window opening and a substantially vertically slidable transparent panel in rear thereof; guide means adapted to be mounted entirely within the well for guiding the forward edge of the sliding panel comprising short and long guides with which the forward edge and a device on the forward bottom edge of the sliding panel, respectively, cooperate, the long guide being disposed forwardly of the short guide and said device being arranged to extend across the lower end of the short guide into engagement with the long guide when the panel is in raised position.

23. In a window structure of the type having a window opening, a window well therebelow, a pivoted wing-type panel at the forward part of the window opening and a substantially vertically slidable transparent panel in rear thereof; guide means adapted to be mounted within the well for guiding the forward edge of the sliding panel, comprising a relatively short guide terminating adjacent the lower edge of the window opening and through which said forward edge of the panel slides, a relatively long guide extending below the short guide well down into the well, and a device carried by the sliding panel extending across the lower end of the short guide and slidingly engaging the long guide, said guides being secured in fixed positions in longitudinally offset relation.

24. In a window structure of the type having a window opening, a window well therebelow, a pivoted wing-type panel and a vertically slidable transparent panel cooperable to close said opening; guide means adapted to be mounted in said well for guiding the upright edge of the sliding panel, which is adjacent the pivoted panel, into and out of the well, comprising a relatively short fixed channel guide at the upper part of the well through which said edge of the panel slides and an adjacent relatively long upright guide movably receiving a projection on the bottom of the panel, said guide means being operable to guidingly support said sliding panel at separate points increasingly spaced in a vertical direction as the panel is lowered into the well.

25. In a window structure of the type having a window opening, a window well therebelow, a pivoted wing-type panel and a vertically slidable transparent panel cooperable to close said opening; guide means adapted to be mounted in said well for guiding the forward upright edge of the sliding panel into and out of the well, comprising a fixed guide at the upper end of the well with which the said edge of the sliding panel slidingly cooperates and a second fixed guide movably engaged by a projection on the lower edge of the sliding panel, said first named guide terminating at the lower edge of the window opening and located substantially in line with the line of juncture of said panels and said second named guide also terminating below the window opening and adjacent the forward edge of the sliding panel.

26. In a window structure of the type having a window opening, a window well therebelow, a pivoted wing-type panel and a vertically slidable transparent panel cooperable to close said opening; guide means adapted to be mounted in said well for guiding the forward upright edge of the sliding panel into and out of the well, comprising a fixed guide at the upper end of the well with which the said edge of the sliding panel slidingly cooperates and a second fixed guide movably engaged by a projection on the lower edge of the sliding panel, said first named guide terminating at the lower edge of the window opening and located substantially in line with the line of juncture of said panels and said second named guide also terminating below the window opening and adjacent the forward edge of the sliding panel and being materially longer than the first named guide.

27. In a window structure of the type having a window opening, a window well therebelow, a pivoted wing-type panel and a vertically slidable transparent panel cooperable to close said opening; guide means adapted to be mounted in said well for guiding the forward upright edge of the sliding panel into and out of the well, comprising a fixed guide at the upper end of the well with which the said edge of the sliding panel slidingly cooperates and a second fixed guide movably engaged by a projection on the lower edge of the sliding panel, said first named guide terminating at the lower edge of the window opening and located substantially in line with the line of juncture of said panels and said second named guide also terminating below the window opening and adjacent the forward edge of the sliding panel, said guides being secured together and forming a compound guide for the forward edge of the sliding panel rearward of the pivoted panel.

28. In a window structure of the type having a window opening, a window well therebelow, a pivoted wing-type panel at the forward part of the window opening and a substantially vertically slidable transparent panel in rear thereof provided with a metal bar on its forward upright edge overlapping the adjacent edge of the pivoted panel; guide means adapted to be mounted substantially entirely within the well below the forward portion of the sliding glass panel comprising a relatively short guide channel slidingly receiving said bar in all positions thereof and a relatively long guide movably receiving a device on the sliding panel, said guides being operable to guidingly support said sliding panel at separate points increasingly spaced in a vertical direction as the panel is lowered into the well.

29. In a window structure having a window frame provided with a window well, a pivoted wing-type panel and a vertically slidable transparent panel cooperable to close a window opening in said frame when the slidable panel is raised; a fixed upright guide adapted to be mounted entirely in said well below the wing-type panel and longitudinally beyond the slidable panel, a channel bar adapted to engage the forward upright edge of the slidable panel, a retainer strip adapted to be secured to the lower edge of the slidable panel, a bracket secured to the retainer strip at one end thereof, and a guide device carried by the bracket below the panel extending longitudinally beyond the lower end of said channel bar and movably engaging said guide, said guide device being spring pressed in a longitudinal direction to constantly engage said guide and compensate for slight displacements of the slidable panel longitudinally in its plane.

JOHN H. ROETHEL.